United States Patent
So (10) Patent No.: US 9,660,549 B2
(45) Date of Patent: May 23, 2017

(54) SWITCHING MODE POWER SUPPLY

(71) Applicant: SAMSUNG ELECTRONICS CO., LTD., Suwon-si, Gyeonggi-do (KR)

(72) Inventor: Kyung-hwan So, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/743,383

(22) Filed: Jun. 18, 2015

(65) Prior Publication Data

US 2015/0288294 A1    Oct. 8, 2015

Related U.S. Application Data

(63) Continuation of application No. 13/152,912, filed on Jun. 3, 2011, now Pat. No. 9,093,905.

(30) Foreign Application Priority Data

Jun. 4, 2010    (KR) .................. 10-2010-0053029

(51) Int. Cl.
*H02J 3/14*        (2006.01)
*H02M 7/217*    (2006.01)
(Continued)

(52) U.S. Cl.
CPC ....... *H02M 7/217* (2013.01); *H02M 3/33507* (2013.01); *H02M 2001/0032* (2013.01);
(Continued)

(58) Field of Classification Search
CPC ............................. H02M 7/217; Y02B 70/16
See application file for complete search history.

(56) References Cited

U.S. PATENT DOCUMENTS 5,483,464 A * 1/1996 Song ................... G06F 1/3215
                                                                    307/38
5,636,109 A    6/1997 Carroll
(Continued)

FOREIGN PATENT DOCUMENTS

| JP | 2001-5350 | 1/2001 |
|---|---|---|
| JP | 2007-159200 | 6/2007 |
| KR | 10-2004-0024953 | 3/2004 |

OTHER PUBLICATIONS

U.S. Appl. No. 13/152,912, filed Jun. 3, 2011, Kyung Hwan So, Samsung Electronics Co., Ltd.
(Continued)

*Primary Examiner* — Daniel Cavallari
(74) *Attorney, Agent, or Firm* — Staas & Halsey LLP (57) ABSTRACT

A switching mode power supply (SMPS) includes a rectifier to rectify an alternating current (AC) voltage; a first transformer to convert the rectified voltage into a first output voltage of the SMPS according to a switching operation of a first switching unit; a second transformer to convert the rectified voltage into a second output voltage of the SMPS according to a switching operation of a second switching unit; first and second switching control units to control the switching operations of the first and second switching units; a power blocking unit to block power supply according to a light signal. The power blocking unit is electrically insulated from the light emitting unit.

6 Claims, 8 Drawing Sheets

(51) Int. Cl.
*H02M 3/335* (2006.01)
*H02M 1/00* (2006.01)

(52) U.S. Cl.
CPC ............... *Y02B 70/10* (2013.01); *Y02B 70/16* (2013.01); *Y10T 307/406* (2015.04)

(56) References Cited

U.S. PATENT DOCUMENTS

| | | |
|---|---|---|
| 5,852,550 A | 12/1998 | Majid et al. |
| 6,408,148 B1 | 6/2002 | Yamamoto |
| 6,462,437 B1 | 10/2002 | Marmaropoulos et al. |
| 6,674,271 B2 | 1/2004 | Choo et al. |
| 6,909,616 B2 | 6/2005 | Kim |
| 7,054,169 B2 | 5/2006 | Huh et al. |
| 7,619,903 B2 | 11/2009 | Choi |
| 7,830,675 B2 | 11/2010 | Nagai et al. |
| 2009/0295469 A1 | 12/2009 | DuBose |
| 2010/0135048 A1 | 6/2010 | Nagai et al. |
| 2011/0157924 A1 | 6/2011 | Huynh |
| 2011/0286243 A1 | 11/2011 | Hsu et al. |

OTHER PUBLICATIONS

European Search Report issued Sep. 1, 2015 in corresponding European Patent Application No. 11168518.6.
Korean Office Action dated Apr. 20, 2016 from Korean Patent Application No. 10-2010-0053029, 14 pages.
Korean Notice of Allowance dated Jul. 18, 2016 from Korean Patent Application No. 10-2010-0053029, 5 pages.
U.S. Office Action issued Aug. 11, 2014 in copending U.S. Appl. No. 13/152,912.
U.S. Notice of Allowance issued Jun. 19, 2015 in copending U.S. Appl. No. 13/152,912.

\* cited by examiner

SWITCHING MODE POWER SUPPLY

CROSS-REFERENCE TO RELATED APPLICATIONS

This application is a continuation of U.S. application Ser. No. 13/152,912 filed on Jun. 3, 2011, which claims priority under 35 U.S.C. §119(a) from Korean Patent Application No. 10-2010-0053029, filed on Jun. 4, 2010, in the Korean Intellectual Property Office, the disclosures of which are incorporated herein in their entirety by reference.

BACKGROUND

1. Field

The present general inventive concept relates to a switching mode power supply (SMPS) and a power supply method using the SMPS.

2. Description of the Related Art

A switching mode power supply (SMPS) may be used as an apparatus for supplying power to electronic products. The SMPS converts input alternating current (AC) voltages and outputs static voltages to operate electronic products. When electronic products stand by for a predetermined period of time, electronic products enter a power saving mode. Electronic products need to guarantee partial functionality while in the power saving mode, and thus the SMPS does not entirely stop operating. Regulations for standby power of electronic products have been recently strengthened in order to reduce amounts of carbon dioxide globally, and thus a method of reducing power consumption of a SMPS in a power saving mode is needed.

SUMMARY

The present general inventive concept provides a power supply method using a switching mode power supply (SMPS) in a power saving mode and a SMPS to perform the method.

Additional features and utilities of the present general inventive concept will be set forth in part in the description which follows and, in part, will be obvious from the description, or may be learned by practice of the present general inventive concept.

The present general inventive concept also provides a computer readable recording medium storing a program to execute the method.

According to feature of the present general inventive concept, there is provided a switching mode power supply (SMPS) including at least two transformers, the SMPS including a rectifier to rectify an alternating current (AC) voltage, a first switching unit to switch the voltage rectified by the rectifier using a first transformer from among the at least two transformers so as to convert the rectified voltage into a first output voltage of the SMPS, a first switching control unit including a startup voltage terminal and a power voltage terminal, the first switching control unit generating a switching signal that controls the first switching unit, and a power blocking unit to block power supply to the startup voltage terminal and the power voltage terminal of the first switching control unit during a power saving mode.

According to another feature of the present general inventive concept, there is provided a switching mode power supply (SMPS) including at least two transformers, the SMPS including: a rectifier to rectify an alternating current (AC) voltage; a first switching unit to switch the voltage rectified by the rectifier using a first transformer from among the at least two transformers so as to convert the rectified voltage into a first output voltage of the SMPS; a second switching unit to switch the voltage rectified by the rectifier using a second transformer from among the at least two transformers so as to convert the rectified voltage into a second output voltage of the SMPS; a second switching control unit to control the second switching unit and comprising a second power voltage terminal; a first switching control unit to control the first switching unit, and comprising a first power voltage terminal connected to the second power voltage terminal; and a power blocking unit to block power supply to the first power voltage terminal in a power saving mode.

According to another feature of the present general inventive concept, there is provided a apparatus including an auxiliary power unit and a switching mode power supply (SMPS), the apparatus including: the SMPS to convert a rectified voltage into a first output voltage, a second output voltage, and a charging voltage of the SMPS, using a transformer, and blocking power supply to a startup voltage terminal and a power voltage terminal of a switching control unit to control switching of a voltage input to the transformer in a power saving mode; and the auxiliary power unit charged by the charging voltage and electrically separated from the SMPS in the power saving mode.

According to another feature of the present general inventive concept, there is provided an image forming apparatus including a switching mode power supply (SMPS), the apparatus including: a main control module to output a signal indicating that the image forming apparatus is in a power saving mode; the SMPS comprising a transformer, and wherein the SMPS is to block power supply to a startup voltage terminal and a power voltage terminal of a switching control unit to control switching of a voltage input to the transformer by using the signal indicating that the image forming apparatus is in the power saving mode; and an image forming unit controlled by the main control module, wherein the image forming unit is to form an image of printing data.

According to another feature of the present general inventive concept, there is provided a power supply method using a switching mode power supply (SMPS) including at least two transformers, the method including: blocking power supply to a startup voltage terminal and a power voltage terminal of a switching control unit to control switching of a voltage input to a first transformer from among the at least two transformers in a power saving mode; and outputting an output voltage to operate a main control module of an apparatus including the SMPS in the power saving mode using a second transformer from among the at least two transformers.

According to another feature of the present general inventive concept, there is provided a computer readable recording medium storing a program to execute a method.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE EMBODIMENTS

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 1:
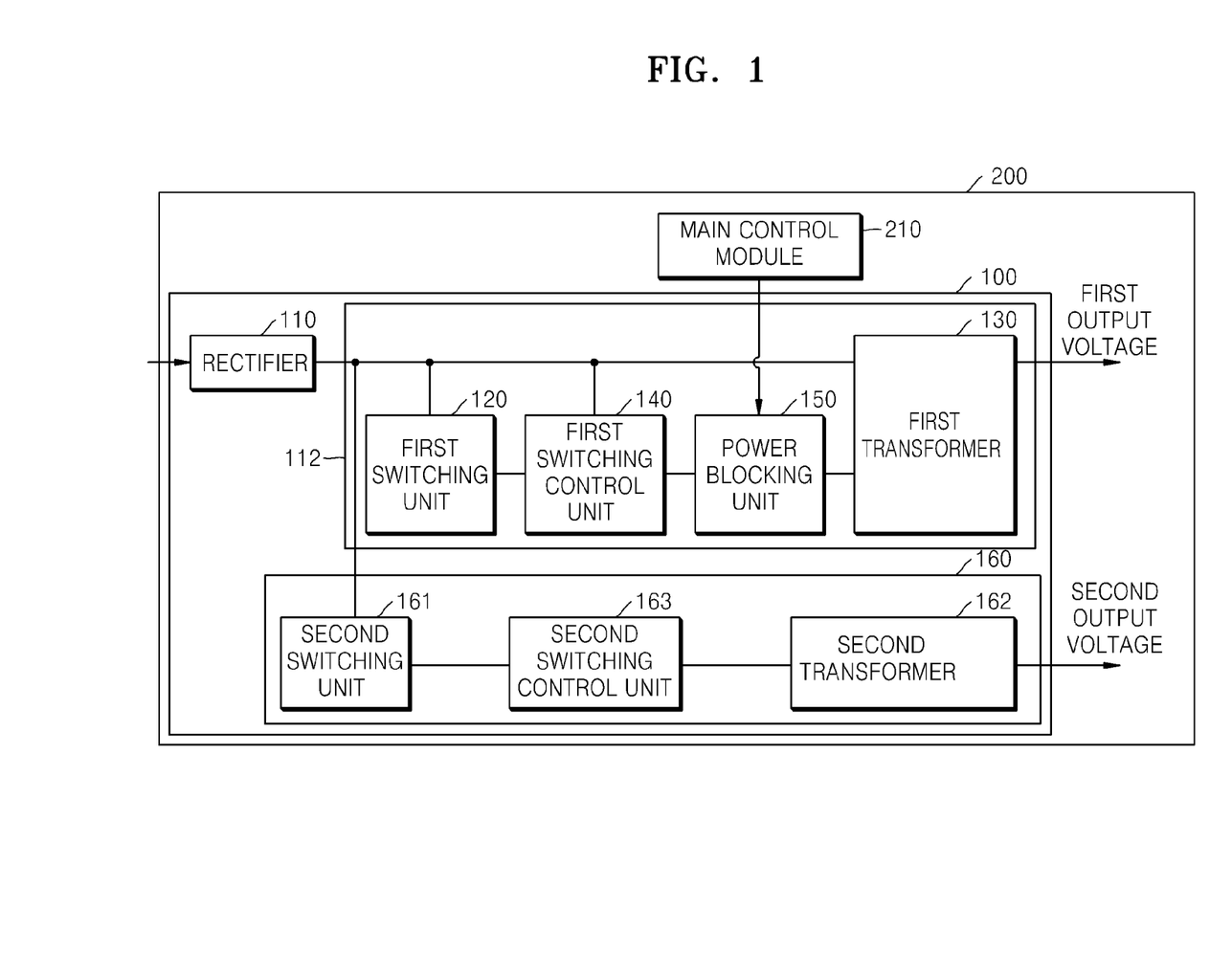
FIG. 1 is a block diagram of an apparatus including a switching mode power supply (SMPS) according to an embodiment of the present general inventive concept.

FIG. 1 is a block diagram of an apparatus 200 including a switching mode power supply (SMPS) 100 according to an exemplary embodiment of the present general inventive concept. The apparatus 200 is operable in an operation mode to perform one or more operations, and a power saving mode to reduce power consumption after the apparatus 200 does not perform an operation after a predetermined time period. The operations of the apparatus include, but are not limited to, scanning, printing, displaying, faxing, emailing, etc. Referring to FIG. 1, the SMPS 100 includes a rectifier 110, a first output voltage unit 112, and a second output voltage unit 160. The first output voltage unit 112 includes a first switching unit 120, a first transformer 130, a first switching control unit 140 and a power blocking unit 150. The second output voltage unit 160 includes a second switching unit 161, a second transformer 162, and a second switching control unit 163. The apparatus 200 including the SMPS 100 may further include a main control module 210 that may control and/or determine various operations of the apparatus 200.

The SMPS 100 and the apparatus 200 shown in FIG. 1 include elements relating to the present embodiment. Thus, it is obvious to one of ordinary skill in the art that the SMPS 100 and the apparatus 200 may further include general-purpose elements other than the elements shown in FIG. 1.

The apparatus 200 may include an image forming device, an image scanning device, a multi-function peripheral (MFP), a PC, a monitor, a facsimile, a TV, and the like. Further, the apparatus 200 is not limited thereto, and may be any apparatuses including the SMPS 100.

The main control module 210 may include a controller to operate the apparatus 200. The main control module 210 may include a microcomputer (MICOM) in electrical communication with the apparatus 200. The description relating to the main control module 210 will be described in the power blocking unit 150 below.

The SMPS 100 according to an exemplary embodiment of the present general inventive concept may include at least two transformers.

The rectifier 110 rectifies an alternating current (AC) voltage. In more detail, the rectifier 110 rectifies an applied AC voltage and outputs a direct current (DC) voltage. The DC voltage may, for example, be a high DC voltage having a voltage level greater than the applied AC voltage.

For example, the rectifier 110 may include a rectification element to rectify AC power and a planarization element to planarize the rectified power. The rectification element includes, but is not limited to, a bridge circuit constructed of diodes, and the planarization element may include, but is not limited to, a capacitor.

The first switching unit 120 switches the voltage rectified by the rectifier 110 using the first transformer 130 so as to convert the rectified voltage into a first output voltage of the SMPS 100. The first output voltage may be, for example, a low DC voltage so as to operate a module other than the main control module 210 of the apparatus 200 including the SMPS 100. In at least one exemplary embodiment, a low DC voltage corresponding to the first output voltage may include, but is not limited to, approximately 24 volts.

The first transformer 130 transfers electrical energy from a circuit to another circuit according to an induction function of a coil. For example, the first transformer 130 may transfer electrical energy applied to a first coil to second and third coils according to an operation of the first switching unit 120. Thus, the first coil of the first transformer 130 receives the voltage switched by the first switching unit 120 and transfers the switched voltage to the second and third coils.

The first switching control unit 140 controls outputs a switching signal to control operation of the first switching unit 120. Accordingly, the first switching unit 120 generates the first output voltage in response to the switching control signal output from the first switching control unit 140. The first switching control unit 140 may include a power voltage terminal 141, a startup voltage terminal 142, and a driving terminal 143. Accordingly, the first switching control unit 140 outputs a control signal from the driving terminal 143 to control the first switching unit 120.

For example, the first switching control unit 140 may include, but is not limited to, a pulse-width modulation (PWM) integrated circuit (IC).

The power blocking unit 150 blocks power supply to the startup terminal and the power voltage terminal of the first switching control unit 140 in the power saving mode.

For example, when the apparatus 200 including the SMPS 100 is in the power saving mode, the main control module 210 outputs a signal indicating that the apparatus 200 is in the power saving mode. The power blocking unit 150 blocks power supply to the startup terminal 142 and the power voltage terminal 141 of the first switching control unit 140, by using the signal indicating that the apparatus 200 is in the power saving mode output from the main control module 210. Accordingly, when power to the startup terminal 142 and the power voltage terminal 141 is blocked, operation of the first switching unit 120 is halted, and output of the first output voltage is no longer generated.

The power blocking unit 150 may include one, or more disconnection units 151, 152 to disconnect the startup terminal 142 and the power voltage terminal 141 from receiving power. The disconnection units 151, 152 may include, but are not limited to, at least one of a switch, transformer, relay, and photo coupler so as to block power supply to the startup terminal and the power voltage terminal of the first switching control unit 140, and may include any switching element to transfer a signal between electrically insulated circuits. For example, the power blocking unit 150 may be in electrical communication with the first switching control unit 140 via one or more disconnection units 151,152 coupled to each of the startup terminal 142 and the power voltage terminal 141, as described in greater detail below. Accordingly, the disconnection units 151, 152 may disconnect the startup and power voltage terminals 142, 141 from receiving power. As a result, the signal output from the driving terminal 143 is halted, and the first output voltage is no longer generated. The detailed operation of the power blocking unit 150 is described in more detail below with reference to FIG. 2.

As discussed above, an SMPS 100 of at least one embodiment blocks power supply to the startup terminal 142 and the power voltage terminal 141 of the first switching control unit 140 in the power saving mode, thereby dramatically reducing standby power in the power saving mode.

A conventional SMPS blocks a power voltage being supplied to a first switching control unit. In the conventional case, a first switching unit does not operate, and the first switching control unit does not normally operate. Further, the first switching control unit of the conventional SMPS compares the power voltage with a threshold voltage, when the power voltage of the first switching control unit is below the threshold voltage, the first switching control unit absorbs a startup current through a startup resistor connected to a startup terminal. Since the conventional SMPS blocks power supply to a power voltage terminal of the first switching control unit, although the first switching control unit does not continue operating even though the first switching control unit starts-up due to the startup current, a conduction loss occurs in the startup resistor.

Unlike the conventional SMPS, the power blocking unit 150 of the at least one exemplary embodiment of the present general inventive concept blocks the power supply to the startup terminal and the power voltage terminal of the first switching control unit 140 in the power saving mode, thereby preventing the conduction loss that occurs in the conventional SMPS.

Further, the conventional SMPS described above requires a comparator to compare the power voltage of the first switching control unit with a threshold voltage, a microcomputer unit to supply input power to the comparator, a transistor to block power supply to the first switching control unit, and the like, in order to reduce the standby power in the power saving mode, which causes an increase in the unit cost of the conventional SMPS.

However, the SMPS 100 according to at least one exemplary embodiment of the present general inventive concept reduces the standby power in the power saving mode by using the power blocking unit 150, thereby preventing the unit cost of the SMPS 100 from increasing.

Referring again to FIG. 1, the second output voltage unit 160 outputs a second output voltage of the SMPS 100 during the power saving mode using the second transformer 163. Accordingly, the second output voltage output by the second output voltage unit 160 may be used to operate the main control module 210 of the apparatus 200 including the SMPS 100.

Thus, when the apparatus 200 is in the power saving mode, since the power blocking unit 150 of the SMPS 100 blocks the power supply to the startup terminal and the power voltage terminal of the first switching control unit 140, although the first output voltage of the SMPS 100 is not output, the second output voltage output from the second output voltage unit 160 may still operate the main control module 210 of the apparatus 200.

However, it will be understood by one of ordinary skill in the art that an auxiliary power unit, a battery, or the like may be used instead of the second output voltage unit 160 in order to guarantee the operation of the main control module 210 of the apparatus 200 according to conditions of use. The auxiliary power unit used to guarantee the operation of the main control module 210 of the apparatus 200 will be described in more detail with reference to FIG. 6 described further below.

The second output voltage unit 160 includes the second switching unit 161, the second transformer 162, and the second switching control unit 163.

The second switching unit 161 switches the voltage rectified by the rectifier 110 using the second transformer 162 so as to convert the rectified voltage into the second output voltage of the SMPS 100. The second output voltage may be, for example, a low DC voltage so as to operate the main control module 210 of the apparatus 200 including the SMPS 100. In at least one exemplary embodiment of the present general inventive concept, a low DC voltage corresponding to the second output voltage may be, but is not limited to, approximately 5 volts and approximately 3.3 volts.

The second transformer 162 transfers electrical energy from a first circuit to a second circuit according to an induction characteristic of a coil included in the second transformer 162. For example, the second transformer 162 may transfer electrical energy applied to a first coil to second and third coils according to an operation of the second switching unit 161.

The second switching control unit 163 controls the second switching unit 161. The second switching control unit 163 may include a power voltage terminal 141, a start-up voltage terminal 142, and a driving terminal 143. Accordingly, the second switching control unit 162 controls the second switching unit 161 by using a signal output from the driving terminal 143.

For example, the second switching control unit 163 may include, but is not limited to, a PWM integrated circuit (IC).

Therefore, when the apparatus 200 is in the power saving mode, the SMPS 100 guarantees the operation of the main control module 210 using the second output voltage unit 160. The power blocking unit 150 blocks power supply to the startup terminal and the power voltage terminal of the first switching control unit 140, and thus the switching operation of the first switching unit 120 stops, thereby reducing standby power in the power saving mode.

Figure 2:
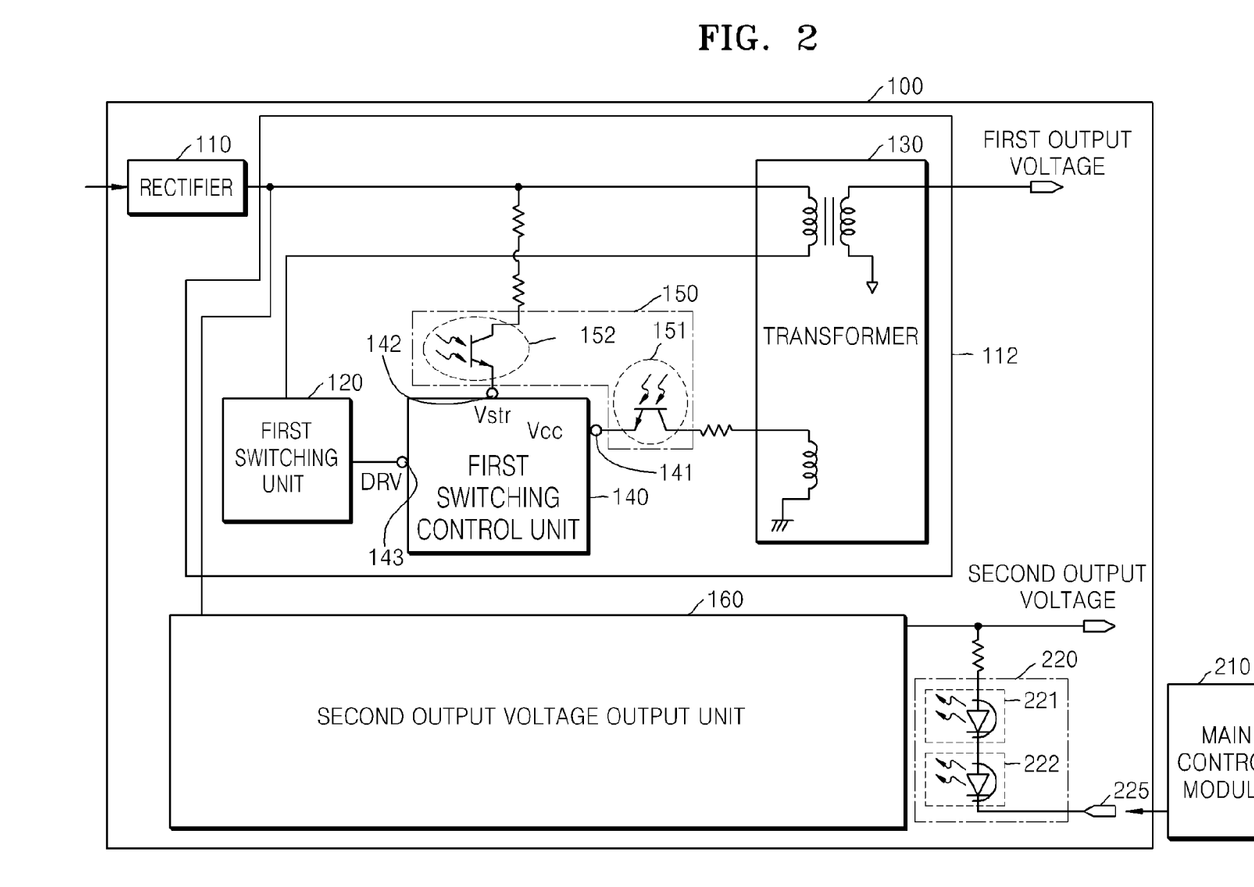
FIG. 2 is a circuit diagram of a power blocking unit of FIG. 1 according to an embodiment of the present general inventive concept.

FIG. 2 is a circuit diagram of the power blocking unit 150 of FIG. 1 according to an exemplary embodiment of the present general inventive concept. Referring to FIG. 2, the first switching control unit 140 includes a power voltage terminal 141, a startup voltage terminal 142, and a driving terminal 143. The power blocking unit 150 includes a first light receiving unit 151 and a second light receiving unit 152. The first and second light receiving units 151, 152 respond to respectively first and second light emitting units 221, 222, as discussed in greater detail below.

A light emitting module 220 includes a first light emitting unit 221 and a second light emitting unit 222. The first light emitting unit 221 controls the first light receiving unit 151. The second light emitting unit 222 controls the second light receiving unit 152. Further, the light emitting module 220 may include, but is not limited to, a photo coupler, that includes the light receiving units 151, 152 and the light emitting units 221, 222.

The light receiving units 151, 152 and the light emitting units 221, 222 are electrically insulated from each other. When current does not flow to the light emitting units 221, 222, the light emitting units 221, 222 do not emit light, and thus the light receiving units 151, 152 are electrically insulated from each other, and are opened, thereby disconnecting the power voltage terminal 141 and the startup voltage terminal 142. When current flows to the light emitting units 221, 222, the light emitting units emit light 221, 222, and thus the light receiving units 151, 152 are shorted. The light receiving units being opened means that the light receiving units are powered off. The light receiving units being shorted means that the light receiving units are powered on. Operation of a photo coupler is obvious to one of ordinary skill in the art, and thus a detailed description thereof will not be given here.

The first light receiving unit 151 may block power supply to the power voltage terminal 141 of the first switching control unit 140. The second light receiving unit 152 may block power supply to the startup voltage terminal 142 of the first switching control unit 140. The first light emitting unit 221 may block power supply to the power voltage terminal 141 of the first switching control unit 140 by using the first light receiving unit 151. The second light emitting unit 222 may block power supply to the startup voltage terminal 142 of the first switching control unit 140 by using the second light receiving unit 152.

With respect to the light emitting module 220, when the apparatus 200 is not in the power saving mode (hereinafter, referred to as an operation mode), the main control module 210 applies a first signal to a power saving signal pin 225, and, when the apparatus 200 is in the power saving mode, the main control module 210 applies a second signal to the power saving signal pin 225. For example, the first signal may be a low power signal, and the second signal may be a high power signal. The power saving signal pin 225 is connected to the SMPS 100, and may be included in the apparatus 200 including the SMPS 100, but is not limited thereto, and may be included in the SMPS 100.

When the apparatus 200 is in the operation mode, for example, the main control module 210 applies the first signal to the power saving signal pin 225. If the first signal is applied to the power saving signal pin 225, current flows to the first light emitting unit 221 and the second light emitting unit 222. Thus, when the first light emitting unit 221 and the second light emitting unit 222 emit light, the first light receiving unit 151 and the second light receiving unit 152 are shorted. Accordingly, in at least one exemplary embodiment, when the apparatus 200 is in the operation mode, the SMPS 100 may output both the first output voltage and the second output voltage.

When the apparatus 200 is in the power saving mode, for example, the main control module 210 applies the second signal to the power saving signal pin 225. If the second signal is applied to the power saving signal pin 225, current does not flow to the first light emitting unit 221 and the second light emitting unit 222. Thus, when the first light emitting unit 221 and the second light emitting unit 222 do not emit light, the first light receiving unit 151 and the second light receiving unit 152 are opened. Thus, when the apparatus 200 is in the power saving mode, the power blocking unit 150 blocks power supply to the power voltage terminal 141 and the startup voltage terminal 142 of the first switching control unit 140. Accordingly, in at least one exemplary embodiment, the SMPS 100 halts the operation of the first switching control unit 140 and outputs only the second output voltage during the power saving mode.

The SMPS 100 shown in FIG. 2 is merely an exemplary embodiment and the present general inventive concept is not limited thereto. Although the power saving signal pin 225 is included in the SMPS 100 in at least one exemplary embodiment for descriptive convenience, the present general inventive concept is not limited thereto.

Although a photo coupler may be used as the power blocking unit 150 in the present embodiment, the present general inventive concept is not limited thereto. It is obvious to one of ordinary skill in the art that at least one of a transformer, a switch, and/or a relay may be used as the power blocking unit 150 as described above.

Figure 3:
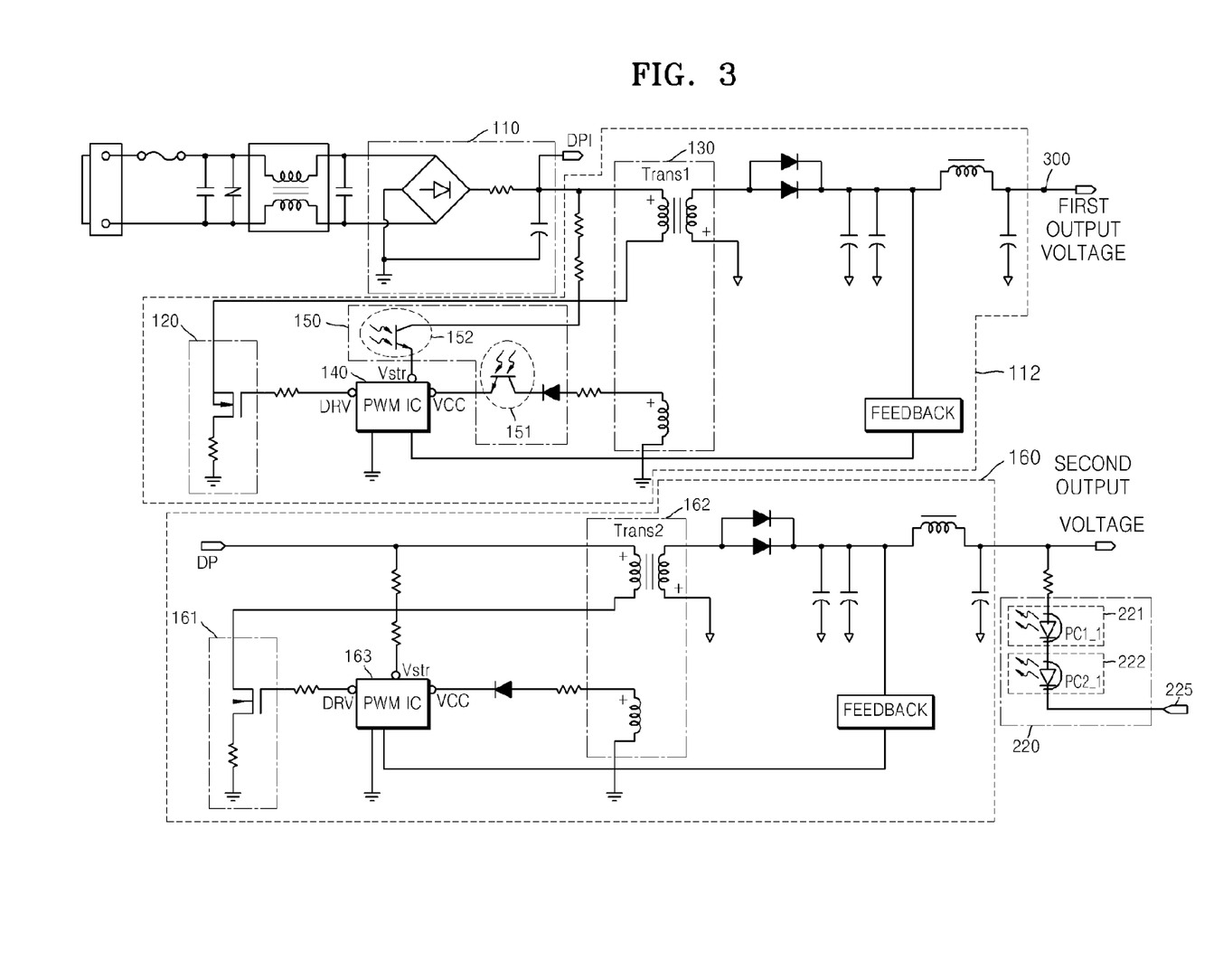
FIG. 3 is a circuit diagram of the SMPS of FIG. 1 according to an embodiment of the present general inventive concept.

FIG. 3 is a circuit diagram of the SMPS 100 according to an exemplary embodiment of the present general inventive concept. The operation principle of a circuit shown in FIG. 3 is obvious to one of ordinary skill in the art with reference to FIGS. 1 and 2, and thus a detailed description thereof will not be repeated here.

With reference to a conventional SMPS, when an output end 300 that outputs a first output voltage in a power saving mode is insulated, the first switching unit 120 and the first switching control unit 140 normally operate, which causes standby power loss.

However, the SMPS 100 according to exemplary embodiments of the present general inventive concept blocks power supply to the power voltage terminal and the startup voltage terminal of the first switching control unit 140 so that the operations of the first switching unit 120 and the first switching control unit 140 are halted, thereby reducing standby power loss. For example, an SMPS 100 according to at least one exemplary embodiment blocks power supply to the power voltage terminal and the startup voltage terminal of the first switching control unit 140, resulting in a reduction of power consumption to approximately 0.13 Watt during the power saving mode.

Figure 4:
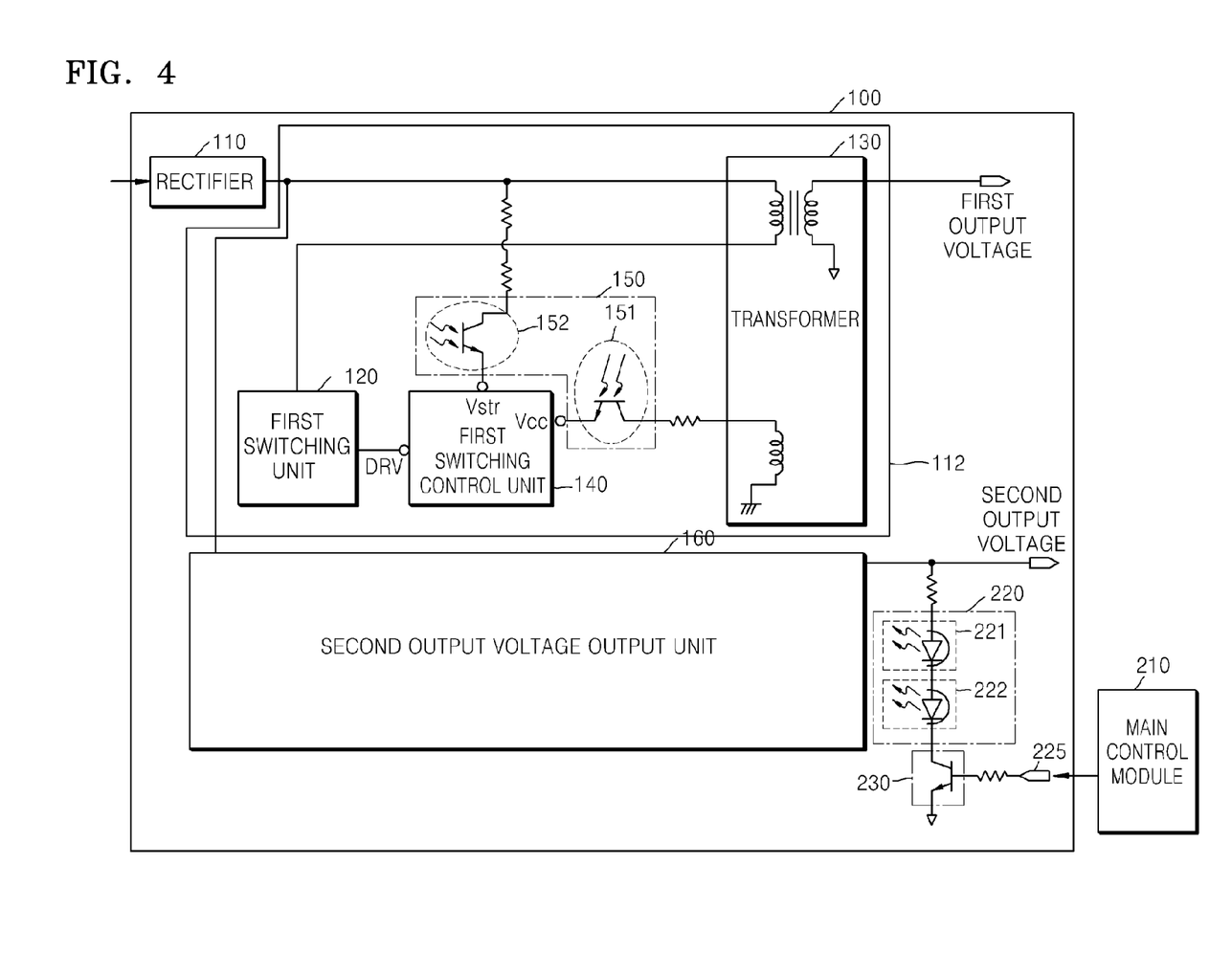
FIG. 4 is a circuit diagram of a power blocking unit of FIG. 1 according to another embodiment of the present general inventive concept.

FIG. 4 is a circuit diagram of the power blocking unit 150 of FIG. 1 according to another exemplary embodiment of the present general inventive concept. Referring to FIG. 4, FIGS. 2 and 4 are the same except that a transistor 230 is further included in the power blocking unit 150, and thus redundant descriptions will not be repeated here.

The power blocking unit 150 of at least one exemplary embodiment includes light receiving units 151 and 152 of a photo coupler that are controlled by the main control module 210.

For example, when the apparatus 200 is in the power saving mode, the main control module 210 outputs a signal indicating that the apparatus 200 is in the power saving mode. The output signal is input to the transistor 230 through the power saving signal pin 225.

The transistor 230 switches a signal input to the light emitting module 220 by using the signal indicating that the apparatus 200 is in the power saving mode output from the main control module 210. The power saving signal pin 225 and the transistor 230 of at least one exemplary embodiment may be included in the apparatus 200 including the SMPS 100, but is not limited thereto, and may be included in the SMPS 100.

When the apparatus 200 is in the operation mode, for example, the main control module 210 applies a first signal to the power saving signal pin 225. If the first signal is applied to the power saving signal pin 225, the transistor 230 is powered on, and thus current flows to the first light emitting unit 221 and the second light emitting unit 222.

Thus, when the first light emitting unit 221 and the second light emitting unit 222 emit light, the first light receiving unit 151 and the second light receiving unit 152 are shorted. Accordingly at least one exemplary embodiment provides that, when the apparatus 200 is in the operation mode, the SMPS 100 outputs both the first output voltage and the second output voltage.

When the apparatus 200 is in the power saving mode, for example, the main control module 210 applies a second signal to the power saving signal pin 225. If the second signal is applied to the power saving signal pin 225, the transistor 230 is powered off, and thus, current does not flow to the first light emitting unit 221 and the second light emitting unit 222. It can be appreciated that, for example, the first signal applied to the power saving pin 225 may be a high signal, and the second signal may be a low signal having a signal level being lower than the high signal. Thus, when the first light emitting unit 221 and the second light emitting unit 222 do not emit light, the first light receiving unit 151 and the second light receiving unit 152 are opened (powered off). Accordingly, when the apparatus 200 is in the power saving mode, the power blocking unit 150 blocks power supply to the power voltage terminal and the startup voltage terminal of the first switching control unit 140. As a result, at least one exemplary embodiment of the present general inventive concept provides a SMPS 100 that halts operation of the first switching control unit 140 and outputs only the second output voltage in the power saving mode.

Therefore, the apparatus 200 including the SMPS 100 further includes the transistor 230, thereby reducing current consumption and implementing a stable operation.

Figure 5:
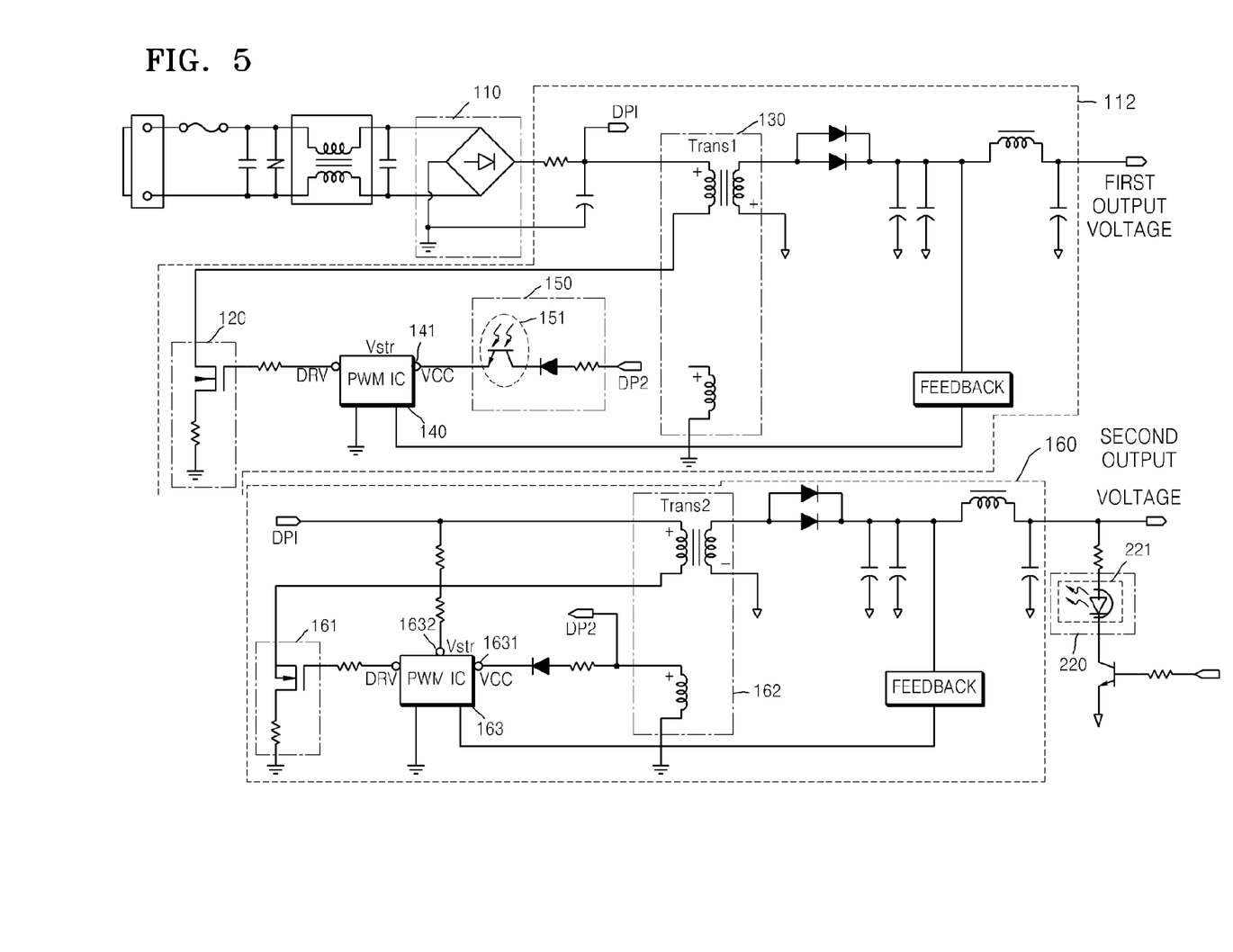
FIG. 5 is a circuit diagram of the SMPS of FIG. 1 according to another embodiment of the present general inventive concept.

FIG. 5 is a circuit diagram of the SMPS 100 according to another exemplary embodiment of the present general inventive concept. Referring to FIG. 5, FIGS. 3 through 5 are the same except that the first switching control unit 140 does not include a startup voltage terminal, and thus redundant descriptions will not be repeated here.

The first switching control unit 140 of the SMPS 100 of at least one exemplary embodiment does not include a startup voltage terminal 142. Thus, to operate the first switching control unit 140, the power voltage terminal 141 of the first switching control unit 140 is connected to a power voltage terminal 1631 of the second switching control unit 163. Power is supplied to a startup voltage terminal 1632 of the second switching control unit 163 so that the second switching control unit 163 can operate, and thus power can be supplied to the power voltage terminal 141 of the first switching control unit 140 connected to the power voltage terminal 1631 of the second switching control unit 163.

If the first switching control unit 140 does not include a startup voltage terminal 142, the power blocking unit 150 blocks power supply to the power voltage terminal 141 of the first switching control unit 140 in the power saving mode. If the power blocking unit 150 is a photo coupler, for example, the power blocking unit 150 may include the first light receiving unit 151 of the photo coupler that blocks power supply to the power voltage terminal 141 of the first switching control unit 140. The light emitting module 220 may include the first light emitting unit 221 that controls the first light receiving unit 151.

Thus, when the switching control unit 140 does not include a startup voltage terminal 142, the power blocking unit 150 blocks power supply to the power voltage terminal 141 of the first switching control unit 140 during the power saving mode, thereby reducing power consumption.

Figure 6:
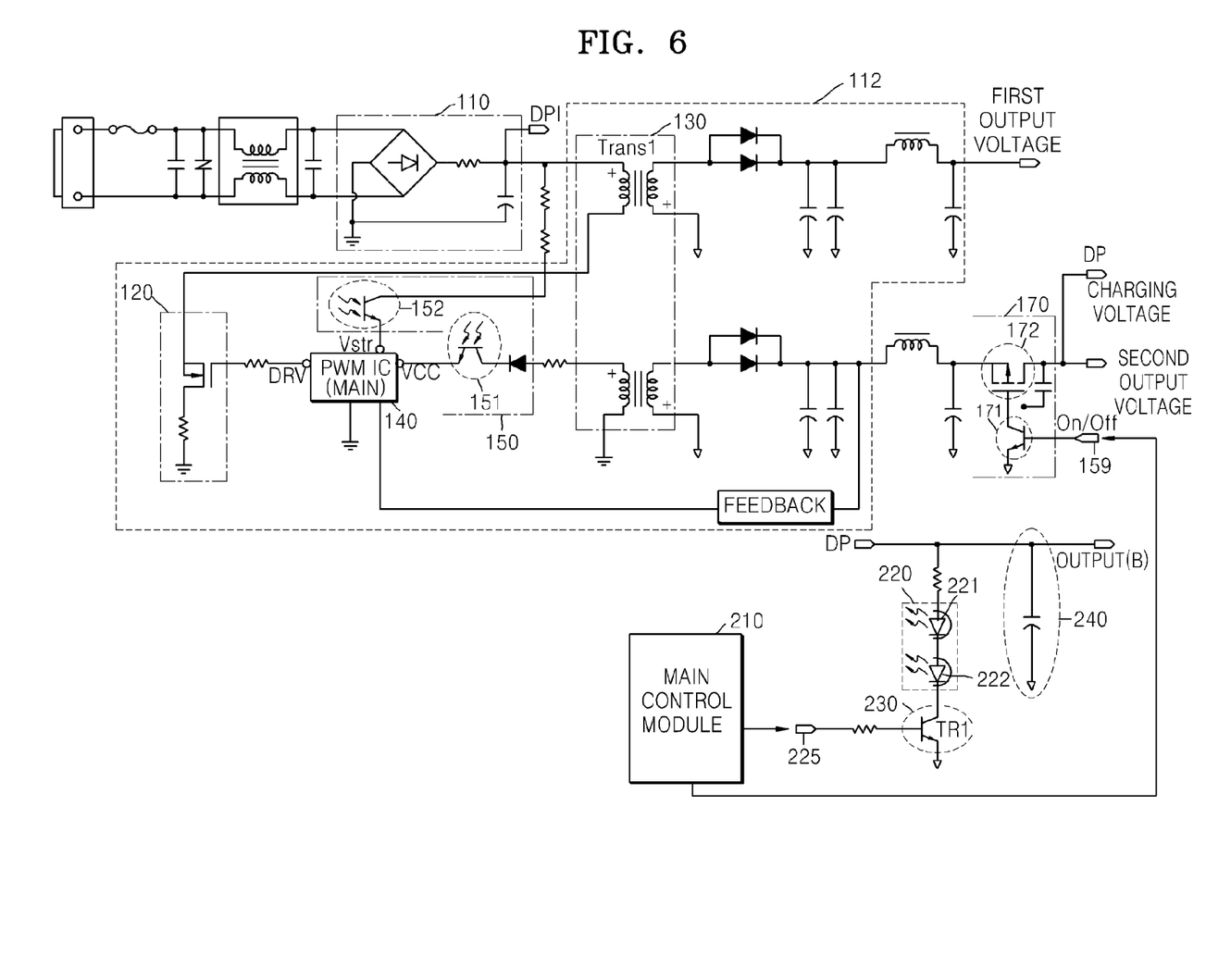
FIG. 6 is a block diagram of an apparatus including an auxiliary power unit and a SMPS according to another embodiment of the present general inventive concept.

FIG. 6 is a block diagram of an apparatus including an auxiliary power unit 240 and a SMPS 100 according to another exemplary embodiment of the present general inventive concept. Referring to FIG. 6, FIGS. 3 through 6 are the same except that the apparatus further includes the auxiliary power unit 240 and an auxiliary power blocking unit 170 and does not include the second output voltage unit 160, and thus redundant descriptions will not be repeated here.

Referring to FIG. 6, the first switching unit 120 converts a voltage rectified by the rectifier 110 into a first output voltage, a second output voltage, and a charge voltage using the first transformer 130. The first output voltage may be used to operate a control module other than the main control module 210 of the apparatus 200, and the second output voltage may be used to operate the main control module 210 of the apparatus 200. The charging voltage may be used to charge the auxiliary power unit 240.

The auxiliary power unit 240 may be charged by the charging voltage converted in the first transformer 130 under the control of the first switching unit 120. The auxiliary power unit 240 of at least one exemplary embodiment may include, but is not limited to, a battery and a capacitor.

The auxiliary power blocking unit 170 electrically separates the auxiliary power unit 240 from the SMPS 100 in a power saving mode. The auxiliary power blocking unit 170 of at least one exemplary embodiment includes, but is not limited to, a transistor 171 and a p-type metal oxide semiconductor field effect transistor (PMOSFET) 172.

When the apparatus 200 is in an operation mode, for example, the main control module 210 applies a first signal to a first power saving signal pin 159 and the second power saving signal pin 225.

If the first signal is applied to the first power saving signal pin 159, the transistor 171 is powered on, and the PMOSFET 172 is shorted. Thus, when the apparatus 200 is in the operation mode, the auxiliary power unit 240 is connected to the SMPS 100.

If the first signal is applied to the second power saving signal pin 225, the transistor 171 is powered on, and the first light receiving unit 151 and the second light receiving unit 152 are powered on. Thus, when the apparatus 200 is in the operation mode, the SMPS 100 outputs the first output voltage and the charging voltage. Accordingly, the auxiliary power unit 240 may be charged by the charging voltage output by the SMPS 100.

When the apparatus 200 is in the power saving mode, for example, the main control module 210 applies a second signal to the first power saving signal pin 159 and the second power saving signal pin 225.

When the apparatus 200 is in the power saving mode, the auxiliary power blocking unit 170 electrically separates the auxiliary power unit 240 from the SMPS 100. For example, if the second signal is applied to the first power saving signal pin 159, the transistor 171 is powered off, and the PMOSFET 172 is opened. Thus, when the apparatus 200 is in the power saving mode, the auxiliary power unit 240 may be electrically separated, i.e., disconnected, from the SMPS 100. As mentioned above, it can be appreciated that, for example, the first signal output by the main control module 220 may be a high signal, and the second signal may be a low signal having a voltage level being lower than the high signal.

If the second signal is applied to the second power saving signal pin 225, the transistor 230 is powered off, so that current does not flow to the first light emitting unit 221 and the second light emitting unit 222, and thus the first light receiving unit 151 and the second light receiving unit 152 are opened (powered off). Thus, when the apparatus 200 is in the power saving mode, the power blocking unit 150 blocks power supply to the power voltage terminal and the startup voltage terminal of the first switching control unit 140.

Therefore, the operation of the first switching control unit 140 is stopped during the power saving mode, so that the SMPS 100 does not output the first output voltage and the second output voltage, whereas the operation of the SMPS 100 can be guaranteed in the power saving mode by the previously charged auxiliary power unit 240.

Figure 7:
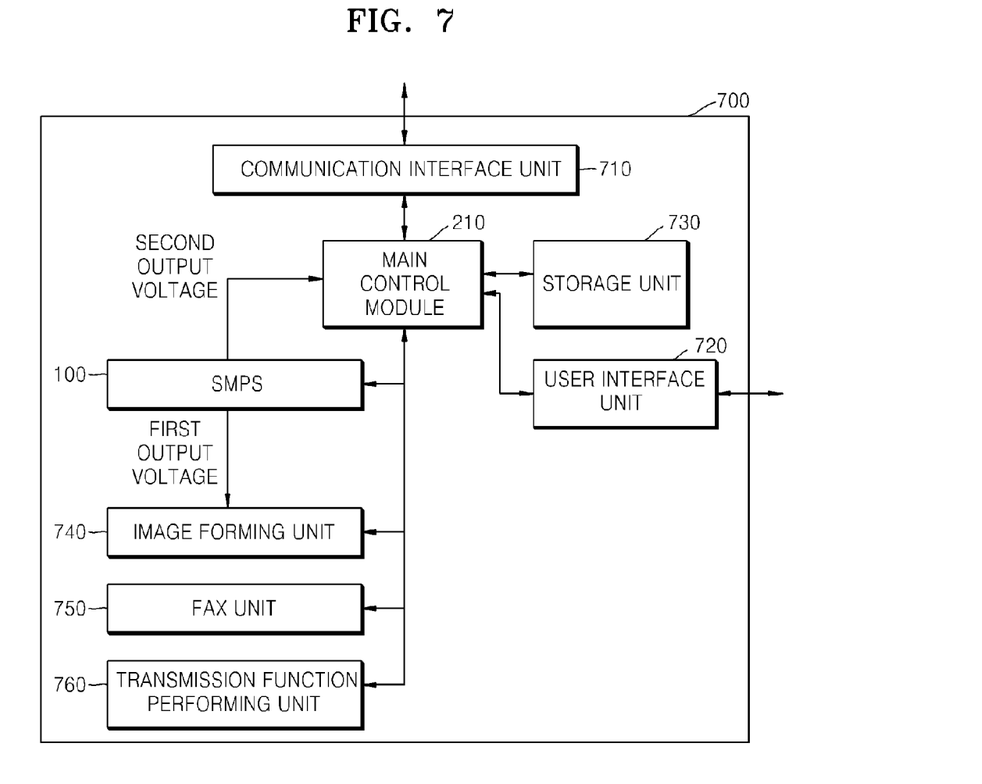
FIG. 7 is a block diagram of an image forming apparatus including a SMPS according to an embodiment of the present general inventive concept.

FIG. 7 is a block diagram of an image forming apparatus 700 including the SMPS 100 according to an exemplary embodiment of the present general inventive concept. Referring to FIG. 7, the image forming apparatus 700 includes the SMPS 100, the main control module 210, a communication interface unit 710, a user interface unit 720, a storage unit 730, an image forming unit 740, a fax unit 750, and a transmission function performing unit 760.

The SMPS 100 includes a first voltage output unit 112 having a first transformer 130, and a second output voltage unit 160 having a second transformer 162. The first voltage output unit 112 receives an input voltage to generate a first output voltage through the first transformer 130 in an operation mode. When the operation mode is switched to a power saving mode, the first voltage output unit stops generating the first output voltage through the first transformer 130. The second voltage output unit 160 receives the first input voltage, and outputs a second output voltage through a second transformer 162 in both the operation mode and in the power saving mode.

The communication interface unit 710 may transmit and/or receive data to and/or from an external apparatus over a network. The communication interface unit 710 of at least one exemplary embodiment includes, but is not limited to, a modem used to transmit and receive data via fax, a network module used to access the network, a universal serial bus (USB) host module used to form a data movement channel with a portable storage medium, and the like according to functions of the image forming apparatus 700. The external apparatus may be connected to the image forming apparatus 700 over a wired or wireless network. The external apparatus may include, but is not limited to a computer system, a mobile terminal, a power digital assistant (PDA), a server, or the like.

The user interface unit 720 may obtain an input signal from a user, and may also display information to the user. For example, the user interface unit 720 includes all input and output devices such as a display panel, a mouse, a keyboard, a touch screen, a monitor, and a speaker disposed in the image forming apparatus 700.

The storage unit 730 stores data including, but not limited to, printing data, scan data, and the like, which may be generated during the operation of the image forming apparatus 700. The image forming unit 740 forms an image of printing data that is to be printed. The fax unit 750 transmits and receives fax data that is to be faxed. The transmission function performing unit 760 transmits a document that is to be transmitted to the external apparatus such as the server, the portable storage medium, the computer system, or the like.

The image forming apparatus 700 of at lest one exemplary embodiment may be an example of the apparatus 200. Thus, if the image forming apparatus 700 is not used for a predetermined period of time and enters a power saving mode, the main control module 210 outputs a signal indicating that the image forming apparatus 700 is in the power saving mode and/or a power blocking signal in response to determining the image forming apparatus 700 has entered the power saving mode. Accordingly, the SMPS 100 blocks power supply to a startup terminal and a power voltage terminal of a switching control unit that controls switching of a voltage that is input to a transformer of the SMPS 100 by using the signal indicating that the image forming apparatus 700 is in the power saving mode and/or the power blocking signal.

Therefore, standby power consumption of the image forming apparatus 700 can be reduced during the power saving mode.

Figure 8:
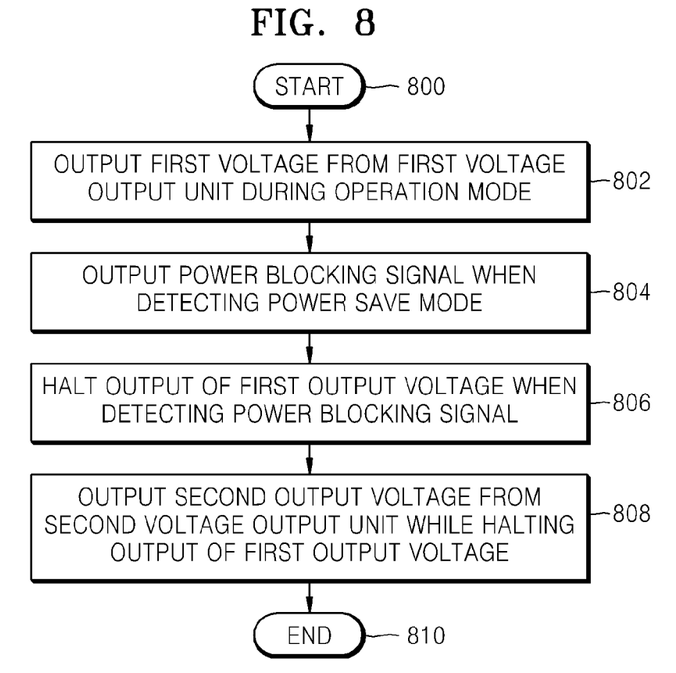
FIG. 8 is a flowchart illustrating a method of supplying power using a switching mode power supply to supply power to an apparatus operable in an operation mode and a power savings mode.

FIG. 8 is a flowchart illustrating a method of supplying power using a switching mode power supply to supply power to an apparatus operable in an operation mode and a power savings mode. The method begins at operation 800, and proceeds to operation 802 where a first voltage output unit outputs a first output voltage from during the operation mode. At operation 804, a power saving mode is detected, and a power blocking signal is output n response to detecting the power savings mode. At operation 806, output of the first output voltage generated by the first voltage output unit is halted in response to the power blocking signal. At operation 808, a second output voltage from a second voltage output unit is output, while output of the first output voltage is halted during the power saving mode, and the method ends at operation 810. Accordingly, at least one exemplary embodiment of Applicant's teachings provides that, although the first output voltage of the SMPS 100 is halted, i.e. not output, when an apparatus 200 is in the power saving mode, the second output voltage output from the second output voltage unit 160 may be utilized to operate various devices, including but not limited to, a main control module 210 of the apparatus 200.

Figure 9:
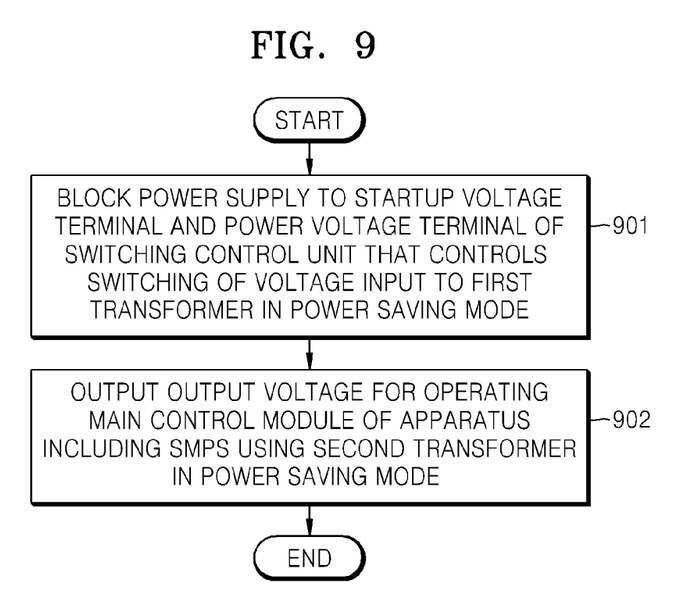
FIG. 9 is a flowchart illustrating a power supply method using a SMPS including two or more transformers according to an embodiment of the present general inventive concept.

FIG. 9 is a flowchart illustrating a power supply method using the SMPS 100 including two or more transformers according to an exemplary embodiment of the present general inventive concept. Referring to FIG. 9, the power supply method includes operations that are time serially processed in the SMPS 100, the apparatus 200 and the image forming apparatus 700 shown in FIGS. 1 through 7. Thus, although not described here, the description of the SMPS 100, the apparatus 200 and the image forming apparatus 700 shown in FIGS. 1 through 7 may be applied to the power supply method of FIG. 9.

In operation 901, the power blocking unit 150 of the SMPS 100 blocks power supply to a startup voltage terminal and a power voltage terminal of the first switching control unit 140 that controls switching of a voltage input to the first transformer 130.

In operation 902, the second output voltage unit 160 outputs an output voltage to operate the main control module 210 of the apparatus 200 including the SMPS 100 using the second transformer 162.

Thus, the SMPS 100 of at least one exemplary embodiment can reduce power consumption in a power saving mode.

The present general inventive concept can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc.

As described above, the power consumption of a SMPS 100 can be reduced during a power saving mode. Furthermore, the number of elements used included with the SMPS 100 is reduced, thereby reducing manufacturing costs of the SMPS 100.

Although a few exemplary embodiments of the present general inventive concept have been shown and described, it would be appreciated by those skilled in the art that changes may be made in these exemplary embodiments without departing from the principles and spirit of the general inventive concept, the scope of which is defined in the claims and their equivalents.

What is claimed is:

1. A switching mode power supply (SMPS) including at least two transformers, the SMPS comprising:
    a rectifier configured to rectify an alternating current (AC) voltage;
    a first transformer configured to convert the rectified voltage into a first output voltage of the SMPS according to a switching operation of a first switch;
    a second transformer configured to convert the rectified voltage into a second output voltage of the SMPS according to a switching operation of a second switch;
    a first switch controller including a first power voltage terminal configured to control the switching operation of the first switch;
    a power blocker configured to block power supply to the first power voltage terminal according to whether a light signal is transmitted to the power blocker;
    a second switch controller including a second power voltage terminal configured to control the switching operation of the second switch, the first power voltage terminal being connected to the second power voltage terminal, a connection between the first power voltage terminal and the second power voltage terminal being a direct connection including the power blocker without additional switches;
    a light emitter configured to emit the light signal to the power blocker according to whether the light emitter receives a signal indicating a power save mode,
    wherein the power blocker is electrically insulated from the light emitter.

2. The SMPS of claim 1, wherein the power blocker is located in an area where a first coil of the first transformer is disposed,
    the light emitter is located in an area where a second coil of the second transformer is disposed,
    the first coil of the first transformer receives the rectified voltage, and
    the second coil of the second transformer outputs the second output voltage.

3. The SMPS of claim 1, wherein the light emitter receives the signal indicating the power saving mode from a main control module.

4. The SMPS of claim 1, wherein the power blocker blocks the power supply to the first power voltage terminal when a light signal is not transmitted from the light emitter to the power blocker, and
    the light signal is not transmitted when the light emitter receives a signal indicating a power saving mode.

5. The SMPS of claim 1, wherein the power blocker allows the power supply to the first power voltage terminal when a light signal is transmitted from the light emitter to the power blocker, and
    the light signal is transmitted when the light emitter receives a signal indicating a operation mode.

6. The SMPS of claim 1, wherein a voltage level of the first power voltage terminal is the same as a voltage level of the second power voltage terminal when the first power voltage terminal is not blocked by the power blocker.

* * * * *